United States Patent [19]

Hashimoto

[11] 3,916,106

[45] Oct. 28, 1975

[54] TELEPHONE ANSWERING AND RECORDING DEVICE

[76] Inventor: Kazuo Hashimoto, 28-2 Komazawa 2-chome, Setagaya-ku, Tokyo 154, Japan

[22] Filed: July 2, 1973

[21] Appl. No.: 375,726

[30] Foreign Application Priority Data

July 3, 1972 Japan .................................. 47-66798

[52] U.S. Cl. .................................................... 179/6 R

[51] Int. Cl.² .......................................... H04M 1/64

[58] Field of Search... 179/6 R, 6 E, 6 AC, 100.2 Z; 274/4 B, 11 B; 242/188; 235/92 DN; 116/114 R; 360/93

[56] References Cited

UNITED STATES PATENTS

| | | | |
|---|---|---|---|
| 3,383,473 | 5/1968 | Schroter | 179/100.2 Z |
| 3,458,667 | 1/1965 | Burquez | 179/100.2 Z |
| 3,678,215 | 7/1972 | Kihara | 274/4 B |
| 3,713,039 | 1/1973 | Hashimoto | 179/6 R |
| 3,721,765 | 3/1973 | Ho | 179/6 R |

*Primary Examiner*—Vincent P. Canney
*Assistant Examiner*—David K. Moore

[57] ABSTRACT

An indicator for a number of telephone calls for the telephone answering and recording device disclosed in U.S. Pat. No. 3,713,039 is characterized by the provision of a ratchet wheel having the same number of ratchets as that of telephone calls, each of said ratchets engageable with a single aperture drilled through the outgoing tape.

6 Claims, 7 Drawing Figures

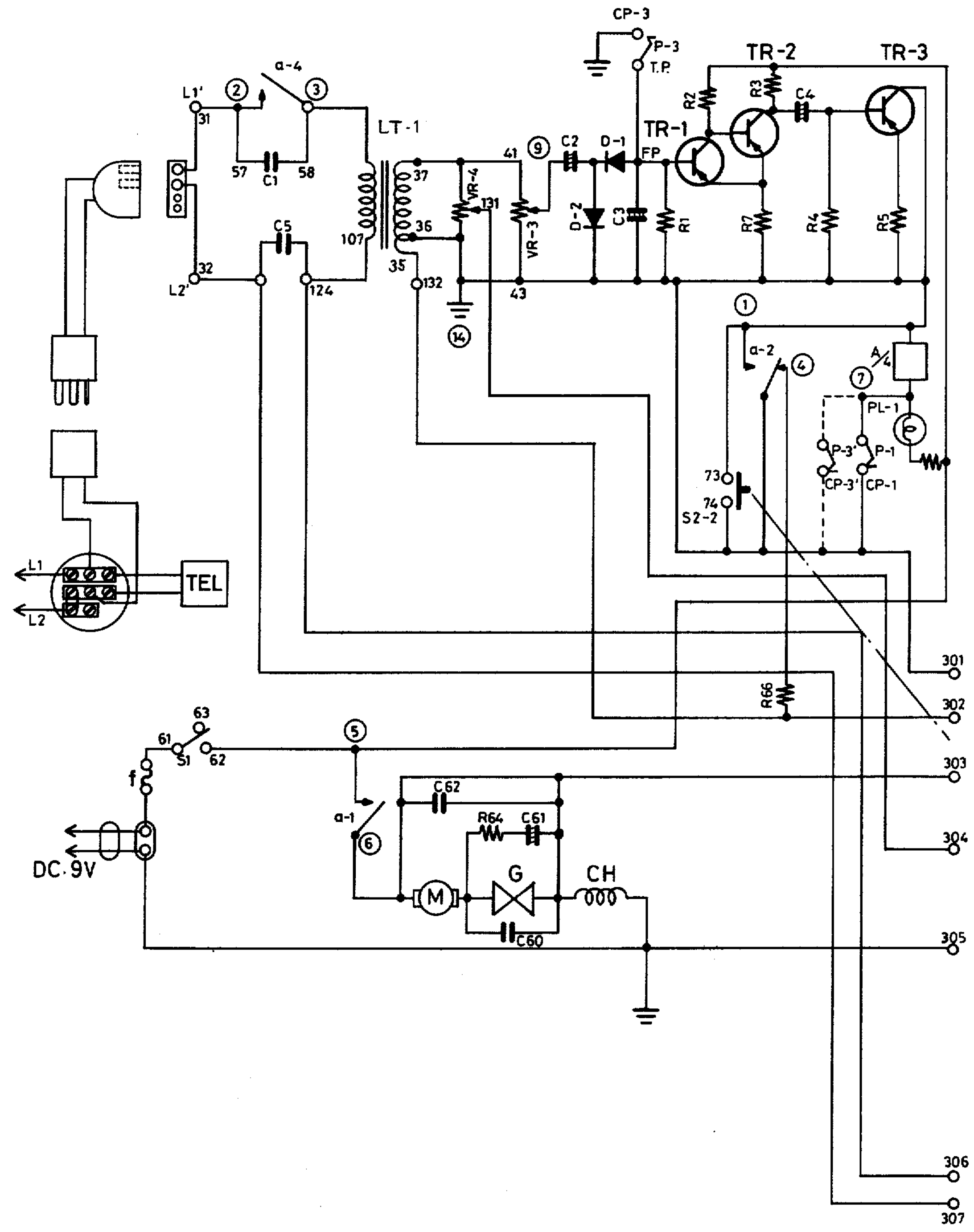
FIG. 6-a

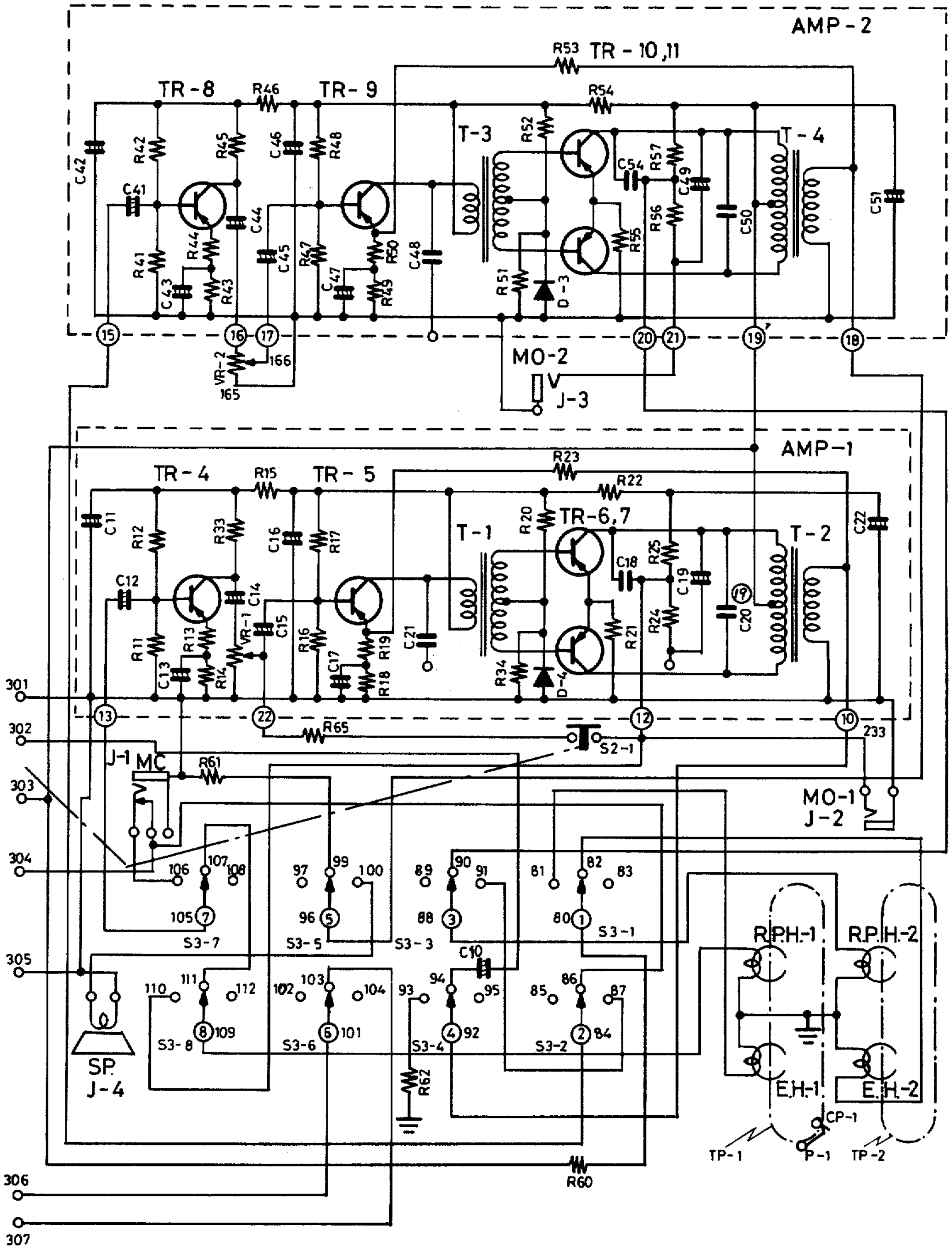
FiG. 6-b

TELEPHONE ANSWERING AND RECORDING DEVICE

This invention relates to an automatic telephone answering and recording device, more particularly, to an indicator for a number of telephone calls therefor.

It is known that there are many kinds of the socalled telephone answering and recording device in which a telephone call is answered in a voice reproduced from the prerecorded magnetic tape in response to the call and the caller's voice or message is in turn recorded on another or incoming magnetic tape in an automatic manner. The present invention is directed to an improvement over the U.S. Pat. No. 3,713,039 entitled, "Telephone Answering and Recording Device," dated Jan. 23, 1973 and granted to me, the present inventor, wherein both outgoing and incoming magnetic tapes of the endless type are simultaneously transported by a common capstan and a single pinch roller in order to simplify the whole mechanism of the device.

THE BACKGROUND OF THE INVENTION

There is a distinct difference between the above U.S. Pat. No. 3,713,039 and my present application that in the former the outgoing magnetic tape is provided with a short tape contact at its end and the incoming magnetic tape is provided with a long tape contact at its end while in the present application the outgoing magnetic tape is provided with an aperture in place of the tape contact.

The aperture of the magnetic tape has triple functions: (1) indicating the number of telephone calls, (2) temporary stopping the telephone answering and recording device in association with the first switching means at every telephone call, and (3) permanently stopping the operation of the device after the completion of the predetermined number of the telephone calls by the second switching means.

THE DETAILED DISCLOSURE OF THE INVENTION

As in the above U.S. Pat. No. 3,713,039, the magnetic tape of the endless type is also used in the present invention. It is well known that the endless tape consists of one tape wherein its leading end is spliced to its trailing end. Hence it follows that the leading end of the endless tape is the same as the trailing one. In this sense, cuing the leading end of the endless tape is quite the same as cuing the trailing one.

However, various inconveniences have been experienced due to the fact that both outgoing and incoming magnetic tapes are at all times transported by the same single capstan. Particularly, a trouble happens very often when the cuing of the incoming tape of the endless type is required in order to utilize the whole length of the incoming tape to the fullest advantage. The details thereof will be described hereinafter.

This invention relates to an indicator for a number of telephone calls associated with the telephone answering and recording device of the above type. When the telephone subscriber comes home after having been outdoors, he or she finds out at once in accordance with the indicator of this invention how many calls the telephone has received during his or her absence. Moreover, I have invented a novel mechanism in association with the indicator, the details of which will be described hereinafter.

Accordingly, it is an essential object of the invention to provide an indicating apparatus for indicating the number of telephone calls received during the subscriber's absence for the telephone answering and recording device wherein both outgoing and incoming magnetic tapes are simultaneously transported by the common capstan and the single pinch roller disclosed in U.S. Pat. No. 3,713,039 granted to me.

It is still another object of the invention to provide apparatus for utilizing the incoming tape to the maximum degree from a standby location at the time of the standby condition during the absence of the telephone subscriber in the telephone answering and recording device of the above type.

It is an additional object of the invention to provide apparatus for preventing answering in response to a further telephone call than the predetermined number of calls as well as erasing the recorded portion of the incoming tape after it has been consumed to record the predetermined number of messages thereon.

Other objects and advantages of the invention will become more apparent when the following description is considered in connection with the accompanying drawings, in which.

FIG. 6-*a* and 6-*b* are an electronic circuit diagram of the device of this invention.

Figure 1:
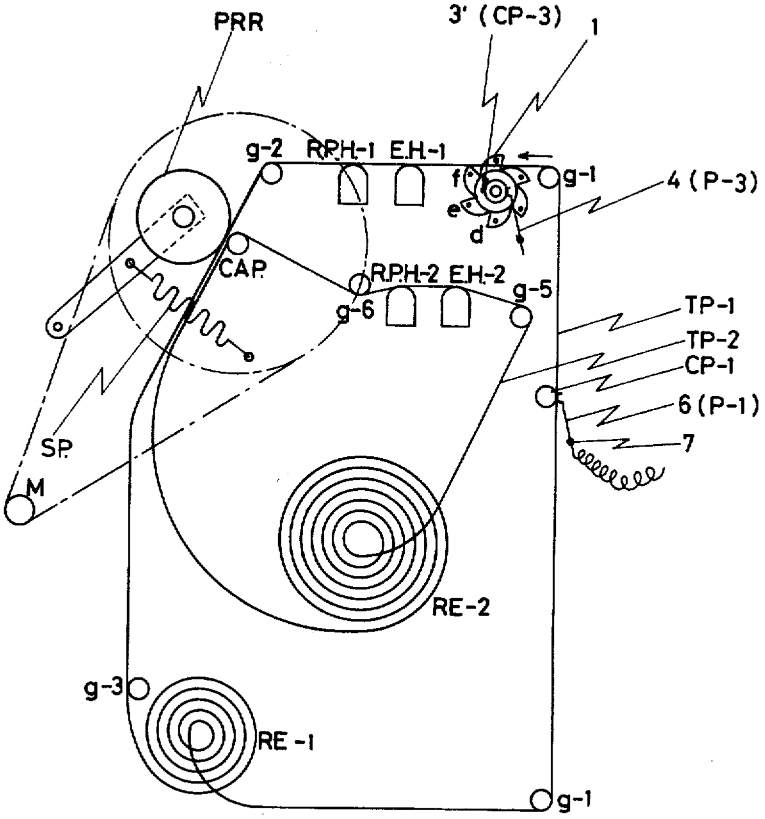
FIG. 1 shows how the magnetic tapes are transported in accordance with a preferred embodiment of the invention.

Referring more particularly to FIG. 1, it is a diagrammatic view showing how the transport mechanism of the magnetic tape works: an outgoing magnetic tape TP-1 of an endless type, an incoming magnetic tape TP-2 of a similar endless type, a common capstan CAP, a common pinch roller PRR, a motor M, and a flywheel in a dotted circle concentric with the capstan CAP are shown; the flywheel is revolved by means of a belt driven by the motor so that the capstan is also driven, whereby it is arranged that the outgoing tape TP-1 and the incoming tape TR-2, both of which are pressed between the capstan and the pinch roller, are simultaneously driven. It is understood that the pinch roller PRR is always urged by a spring SP toward the capstan CAP, and the outgoing tape TP-1 is an endless one disposed within a reel RE-1 while the incoming tape TP-2 is also endless disposed within a reel RE-2.

In FIG. 1, a recording and reproducing head RPH-1 and an erase head EH-1 for the outgoing tape TP-1, and a recording and reproducing head RPH-2 and an erase head EH-2 for the incoming tape TP-2 are shown. In order to transport the tapes in an appropriate manner, a plurality of guide poles g1, g2, g3, g4, g5 and g6 are provided to help transport along them.

Figure 2:
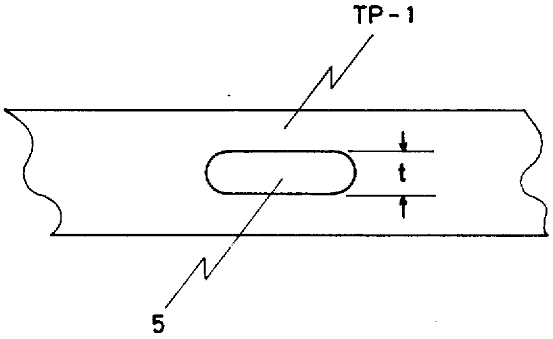
FIG. 2 is an enlarged view of a portion of the outgoing magnetic tape shown in FIG. 1.

FIG. 2 shows a portion of the outgoing tape TP-1 on an enlarged scale, at the center of which there is an oblong aperture 5 drilled through. A ratchet wheel 1 is a circular disk made of a suitable synthetic resin provided with six ratchets on the periphery thereof, the thickness of which is somewhat thinner than the thickness t of the aperture 5 of the tape. This is arranged because each ratchet can easily be engaged with the aperture 5 as described hereinbelow.

In reference to the location of the aperture to be made on the outgoing magnetic tape of the endless type, this aperture should not be made on the spliced portion of the endless tape, because the spliced portion will be weaker if it has an aperture therein.

Figure 4:
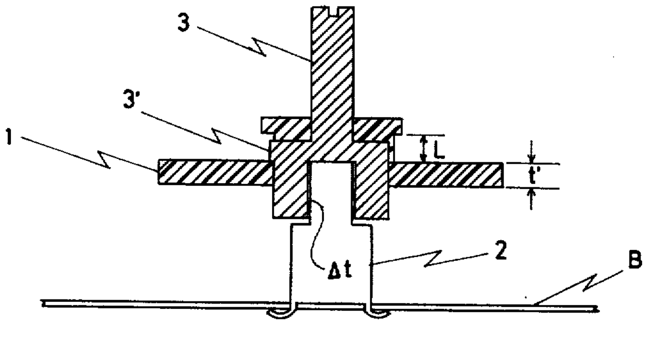
FIG. 4 is another view of the ratchet wheel of FIG. 1.

The ratchet wheel 1 is mounted on the insert member 3' which is mounted on the shaft 2, secured by calking or bolt a nut to the chassis B of the tape transport mechanism as shown in FIG. 4, and further, the ratchet wheel 1 is so supported on the shoulder of the shaft 2 that it is prevented from falling down below.

Figure 3:
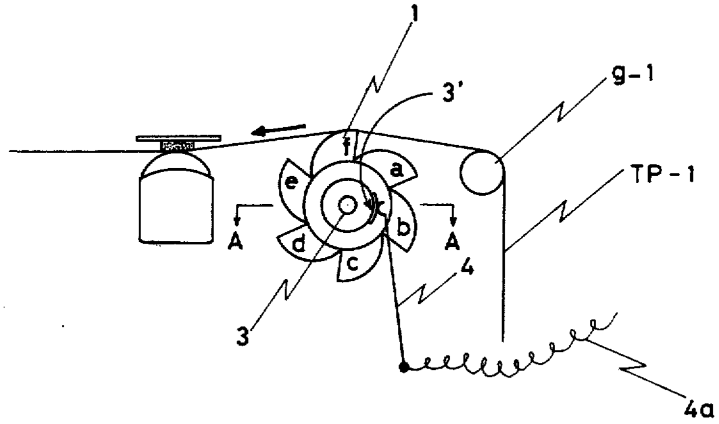
FIG. 3 is a longitudinal section of a ratchet wheel of FIG. 3.

An insert member 3 made of preferably metal is so provided that it fits into the body of the ratchet wheel of synthetic resin when molded as shown in FIG. 3. The insert member 3 is constructed as being fit into the shaft 2 around which the insert member turns. In FIG. 4, a clearance is shown exaggeratedly between the insert member and the shaft, but it is understood that this clearance $\Delta t$ shown in FIG. 4 should be as fine as possible by means of a precision machining step, because insert members 3 of the ratchet wheel 1 is always required to be in electric conduction with the shaft 2 and the chassis B, the electric contact condition of which will be described hereinafter. In the above, it is described that the exposed portion corresponds to the electric contact, but it is to be noted that the exposed portion or electric contact is limited to a one-sixth section of the circle of the ratchet wheel.

An extended top of the insert member 3 is formed as of a hand grip type or of a type turnable by a screw driven. Whether a knob is attached to the top of the insert or not depends on the user's requirement. Therefore, by turning the knob, if attached, the ratchet wheel is freely rotated so that the location of zero can be easily indicated.

In molding the ratchet wheel 1, the insert member 3 is usually preferred to be coated with a synthetic resin, but it is to be noted that a portion 3' thereof is exposed as shown in FIG. 3. This exposed portion 3' corresponds to an electric contact 3' shown in FIG. 1 or FIG. 4. Accordingly, it is arranged that the exposed portion 3' or contact gets in contact with a spring-like brush 4 with the rotation of the ratchet wheel 1. An end of the brush 4 is secured so that it presses itself against the center of the ratchet wheel at all times under the pressure of the spring, and a lead wire 4*a* from the spring-like brush 4 is connected to an outside point being insulated from the other portions.

Furthermore, the spring-like brush 4 gets in touch with the portion 3' of the insert member 3 at the neck L of the synthetic resin portion in FIG. 4. It is thus arranged that the ratchet wheel 1 revolves from ratchet to ratchet by the tape because the ratchet wheel is precisely fed from ratchet to ratchet as soon as the foremost end thereof falls down into the aperture of the tape. During the transport of the tape, the spring-like brush 4 presses the neck L of the ratchet wheel with a suitable force of pressure at all times preventing the ratchet wheel from its unwilling rotation because the surface of the tape presses the foremost curved edge of the ratchet tooth as shown in the drawing. FIG. 4 shows how the ratchet wheel turns round.

Assume at the start of the magnetic tape that one ratchet of the ratchet wheel is completely engaged with the aperture 5 of the tape as shown in FIG. 1.

In this connection, when the tape advances in the direction of an arrow with the rotation of the capstan due to the motor, the ratchet of only one ratchet wheel engaged with the aperture 5 is stepped in the direction of the arrow, and thereafter the tape advances by inertia.

FIG. 4 indicates the relation between the tape and the ratchet, and the tape slides on the head with the tape being in contact with the curved edge of the ratchet, but the erroneous operation of the ratchet wheel never happens due to friction, because the spring-like wire brush 4 exerts its pressing action as described hereinabove. In this condition, the tape TP-1 starts to travel around and the aperture 5 of the tape comes to this position again to be engaged with the ratchet f immediately as shown in FIG. 1. At this time, if the tape does not stop, it follows that the ratchet f is fed by one ratchet again. However, it is arranged in the present invention that the tape stops its transport automatically every one round (one cycle) due to the action of an electronic circuit which stops the device, and the electronic circuit is connected to a cord 7 which is in turn connected to a brush-like spring wire 6 disposed adjacent a contact pole CP-1, (hereinafter called "the first switching means" the details of which will be described hereinafter.

Therefore, in view of the location of the contact pole CP-1 and also of the inertia of the motor, when the tape TP-1 stops after one cycle, it is arranged that the ratchet of the ratchet wheel can be engaged with the aperture of the tape TP-1.

In reference to a further telephone call, the tape is fed in succession ratchet after ratchet, and in this embodiment of the invention, five telephone calls can be received advancing the ratchet teeth from *a* to *f*. Let us assume that the ratchet f is in standby at the location shown in FIG. 3, and that the exposed portion 3' of the insert member 3 takes the position shown in FIG. 3. Thus, it is seen that the spring-like wire brush 4 sets, just prior to being in contact with the edge of the portion 3', which is shown in FIG. 3. At this moment, when the tape stops at its last end and the ratchet f is engaged with the aperture 5 of the tape, the wire brush 4 rides fully on the portion 3'. Then, the cord 4a derived from the wire brush 4 is electrically connected to the chassis through the portion 3', the insert member 3, and the shaft 2. Thus, the tape cannot be transported in response to a telephone call, the details of which will be described hereinafter.

At this time when the telephone subscriber comes home, he can look at the condition where the ratchet is fully engaged with the aperture 5 of the tape. This ratchet can be distinguished from other ones, for example, color or figure. If this distinction is designated by the numeral, it is convenient to call it 1, 2, 3, 4, 5 and 0 in place of *a*, *b*, *c*, *d*, *e* and *f*.

Thus, when the subscriber comes home, he can easily perceive how many telephone calls there have been during his absence. It is understood, however, that when the subscriber goes out, he must set the first ratchet as the standby position. At any rate, the subscriber must listen to what is recorded on the tape, so he pushes a manual button to start the motor in order to transport the tape. He pushes the manual push button 52-2 so that the tape is transported, despite the deenergization of the locking circuit P-3 and CP3 due to the electric contact between the wire brush 4 and the chassis. Thus, he can listen to the messages one by one with the reproduction of the recorded incoming tape. At the end of the incoming tape, the ratchet f is again engaged with the aperture of the outgoing tape. However, the device of this invention is not in standby in this condition even if the operation knob is set in the absent position. Hence it is required for the subscriber to push the starting switch $S_2$ to have the tape TP-1 turn around again or to disengage the ratchet f out of the aperture by the manual rotation of the shaft 3 to a little degree. He may do any of the above two steps.

It is also understood that the disengagement of the last ratchet f due to the rotation of the shaft 3 to a small degree by the hand grip results in an effective utilization of the whole length of the tape. Further, as described above, it is more convenient for the user to push the starting switch $S_2$ to feed the tape by one ratchet only. The telephone subscriber can do either of the two steps as may be desired.

The electronic circuit diagram of the device in accordance with a preferred embodiment of the invention will be described in connection with U.S. Pat. No. 3,713,039.

FIG. 6 shows a circuit diagram almost as same as that described in the above U.S. Pat. No. 3,713,039. In FIG. 6, there are shown telephone lines $L_1$ and $L_2$, a telephone set TEL, a relay A provided with contacts a-1, a-2, a-3, and a-4, a line transformer LT-1, variable resistors VR-1 to VR-4, resistors $R_1$ to $R_{64}$, capacitors $C_1$ to $C_{62}$, transistors TR-1 to TR-11, an electric source switch $S_1$, a starting switch $S_2$ consisting of interlocking two gangs $S_{2\text{-}1}$ and $S_{2\text{-}2}$, which comes into contact simultaneously by one action. Further, there is a rotary switch $S_3$ consisting of eight circuits, one of them having three locations, left being for recording outgoing messages, middle for absence, and right for listening-in to the recorded messages when the subscriber comes home, and these three locations being simultaneously driven by the operation knob.

There are also shown a jack J-1 for a microphone MIC, a jack J-2 for monitoring an amplifier AMP-1, a jack J-3 for monitoring an amplifier AMP-2, and a jack J-4 for a loud speaker.

The amplifier AMP-1 is used exclusively for the outgoing tape, and the amplifier AMP-2 for the incoming tape only. The amplifiers consist of 4 transistors respectively, and direct current is supplied from (6) to (19), (19)' as shown in the circuit. There are also shown a micromotor M, a governor G, a choke coil CH, a recording and reproducing head RPH-1 and another RPH-2 and an erase head EH-1 and another EH-2.

A pilot lamp PL-1 is connected to a terminal (5) of the D.C. electric source in series with the relay A. Another end of the relay is connected to the contact pole CP-1 through a terminal (7). The contact pole CP-1 is the one with which the spring-like brush 6 contacts through the aperture 5 of the tape TP-1.

As described in the foregoing, the device of this invention comprises the combination of above components.

In reference to the magnetic tape of the endless type used in this invention, the outgoing tape TP-1 makes one revolution for the period of one minute while the incoming tape TP-2 for recording the caller's message makes one revolution for the period of 5 minutes.

Generally speaking, a telephone set is installed in parallel with a telephone answering and recording device. It is understood that the telephone set works to ring in response to a telephone call even though the telephone answering and recording device does not work.

In operation, the indicator of this invention works as follows: in response to a telephone call, an answering message prerecorded on the outgoing tape TP-1 is reproduced, for example, "This is Hashimoto speaking, 421-2266. I am absent, so your message is recorded. What is your name, please."

In response to this answering message, the calling party replies, for example, "This is Tanaka speaking. I have had an appointment with you at 3 p.m. today, but I will be late due to an urgent business. I will come at 4 p.m. Will you wait ? If you can't, please phone 579-4111 till 2 p.m." This message is recorded on the endless incoming tape TP-2.

About the time when the caller's message comes to an end, it is arranged that the contact pole CP-1 and its opposed contact 6(P-1) are aligned to come into contact with each other through the aperture 5 of the outgoing tape TP-1, which results in deenergizing the relay A/4 of the telephone answering recording device to stop it. This is the operation of the first switching means by which the device stops at every cycle of revolution of the endless outgoing tape TP-1.

As soon as the first cycle of the revolution ends, the tape TP-1 slides on due to its inertia and the aperture 5 is engaged with the first ratchet of the ratchet wheel to feed one ratchet indicating the ordinal number, say, 1. And at this time the device is disengaged from stop at a standby condition.

Figure 5:
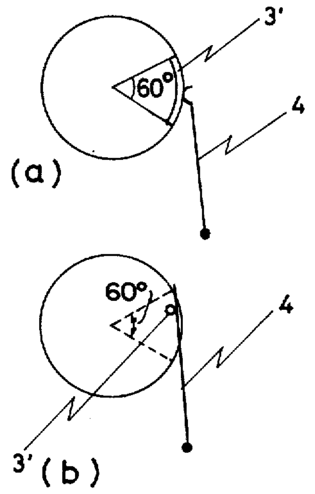
FIG. 5 shows two embodiments of the second switching means affixed to the ratchet wheel.

However, the electric contact means attached to the ratchet wheel does not set into action at this point, because the second switching means including the electric contact attached to the ratchet wheel works only in its one-sixth portion as shown in an embodiment (a) of FIG. 5 wherein the contact CP-3 taking a one-sixth portion of the circular ratchet wheel is embedded in the plastic body thereof to be in contact with the semicircular tip of a spring-like wire brush 4; and a modified embodiment (b) is also shown wherein a pin is embedded to be in contact with the spring-like wire brush and disengaged therefrom after the one-sixth rotation of the ratchet wheel.

In more details, in response to a calling signal from the primary to the secondary of the input transformer LT-1 through the capacitor $C_1$, and this signal is further applied from the middle of the variable resistor VR-3 to the base of the transistor TR-1 through the capacitor $C_2$ and the diodes $D_1$ and $D_2$.

At this time, the capacitor $C_3$ is charged because it has a large capacity, and the rise of an electric potential to a predetermined level makes the transistor TR-1 on. However, when the transistor TR-1 is on, the potential of its collector electrode lowers down. Therefore, the transistor TR-2 which has been on becomes off, which results in the rapid increase of the collector potential.

Then, the base potential of the transistor TR-3 increases due to the presence of the capacitor $C_4$ so that the transistor TR-3 becomes on to actuate the relay A disposed in the collector of the transistor TR-3. The actuation of the relay A makes it self-holding by its contact a-2. Further, other contacts a-1, a-3, and a-4 tilt down in the direction opposite that shown in FIG. 6. Then, the capacitor $C_1$ short-circuits due to on of the contact a-4 which results in the closing of the loop circuit at the primary side of the line transformer LT-1.

At this time, the capacitor $C_5$ also short-circuits at the absence location of the rotary switch as shown in FIG. 1. The making of the contact a-1 energizes the motor to transport the tape so that the prerecorded answering message on the outgoing tape TP-1 is reproduced by the reproducing head RPH-1, the second of which is amplified by the amplifier AMP-1 including the transistors TR-3, TR-5, TR-6 and TR-7 from the input terminal (13) to the capacitor $C_{12}$ through 109 to 111 of the switch $S_{3-8}$ and 107 to 105 of the switch $S_{3-7}$, and its output is applied from the terminal (10) of the output transformer T-2 to the terminal 35 of the tertiary coil of the input transformer through 92 and 94 of the switch $S_{3-4}$ and the capacitor $C_{10}$. Then, this output is induced at the primary coil of the line transformer LT-1 and delivered from the primary coil to the telephone line, which can be heard. It is understood that the necessary outgoing messages are prerecorded on the outgoing tape. There are various methods of recording, and in this invention, the answering messages of the conversation style are prerecorded on the tape TP-1 and the messages of the calling party are recorded on the tape TP-2 during the unrecorded time of the tape TP-1.

When the outgoing tape TP-1 makes one round, the contact pole CP-1 comes in touch with the spring-like brush 6 ($P_1$) by the aperture 5 disposed at the final end of the tape TP-1, thus the relay A is deenergized. A further telephone call repeats the same steps to record the caller's message on the incoming tape TP-2.

How to record the caller's message on the tape TP-2 is as follows: When the calling party talks in response to the outgoing message prerecorded on the tape TP-1, the caller's voice is transmitted from the line transformer LT-1 to 86 and 84 of the switch $S_{3-2}$ through the middle of the variable resistor VR-4, and from the input 15 of the amplifier AMP-2 through the capacitor $C_{41}$ to the transistors TR-8, 9, 10 and 11 for amplification, the output of which is transmitted from the terminal (20) through 90 and 88 of of the switch $S_{3-3}$ to the recording and reproducing head RPH-2 to be recorded on the incoming tape TP-2.

At this time, as described before, a portion of the outgoing message transmitted into the tertiary coil of the line transformer LT-1 is also induced at the secondary winding, so the voice from the outgoing message together with the caller's voice is to be recorded on the tape TP-2. Thus, as long as the capacity of the incoming tape TP-2 is permitted, this tape TP-2 can record whenever there is a telephone call.

In the embodiment of the invention, as a general household appliance, the tape including five messages of the telephone call is used as a standard.

The outgoing tape TP-1 and the incoming tape TP-2 are transported by the single capstan and the pinch roller. It is previously arranged that if the outgoing tape makes one round for the period of one minute, the incoming tape can make one round for the period of five minutes. Hence it follows that the incoming tape consumes to its fullest capacity when the device of the invention receives five telephone calls (five cycles).

In this condition, however, the tape is again transported in response to a further telephone call to erase the first message recorded on the tape TP-2 automatically, but it is practically undesirable.

In order to prevent this erasure, U.S. Pat. No. 3,713,039 discloses that a long conductive foil P-2 is so applied to the end of the incoming tape TP-2 that the tape cannot be transported again. However, various inconveniences are experienced if the location of the conductive foil P-2 on the tape TP-2 is prefixed at a definite point. In this device the initiation or cuing of the leading end of the tape must be effected if the tape TP-2 if going to be used to the fullest degree as long as its capacity is permitted from the location where it is after the operation of the tape TP-1, because both tapes TP-1 and TP-2 are simultaneously transported. So it is required to wait for the end of the tape TP-2 while it is transported. Thus, it is necessary for the subscriber to have time and labor.

In this invention, however, in this case, the rotation of the knob of the ratchet wheel as described before results in projecting the first ratchet to initiate the transport of the tape, thus enabling the user to use the whole length of the tape to the fullest extent.

Referring more particularly to FIG. 1 in connection with the above description, let us assume that the spring-like brush 4 (P-3) and its corresponding opponent contact CP-3 are connected as shown in FIG. 6-*a*. Then, in the condition shown in FIG. 3 where the final ratchet f of the ratchet wheel is going to be engaged with the aperture 5 of the tape, the transistor TR-1 cannot be energized in response to the telephone call because the springlike wire brush P-3 is in contact with the contact CP-3 as shown in FIG. 3. Hence the device of this invention does not start its operation in response to the telephone call, so there is no worry that the first message recorded on the incoming tape will be erased.

In case the subscriber comes back home, a manual rotation of the shaft 3 of the ratchet wheel is no longer necessary. At this time he needs only to push the starting switch $S_{2-2}$ for playback in the play position of the rotary switch $S_3$.

Thus, the relay A works to maintain self-holding independently having nothing to do with the transistor TR-1, and the motor M is energized to transport the tape which announces each message of the customers recorded on it during the absence from the start. As soon as he has listened to what is recorded, the ratchet wheel assumes the state shown in FIG. 3 again.

As described before, in this state where the spring-like brush P-3 is in contact with the contact CP-3, the device cannot receive a new telephone call. Therefore, it is advisable for the user to disengage the contact CP-3 corresponding to the portion 3′ from the spring-like wire brush P-3.

If this is an inconvenient case for the user, he has only to push the starting switch $S_{2-2}$ for an instant to let the tape pass by one turn. It is understood in this case the length of the tape TP-3 corresponding to one turn of the tape TP-1 is wasted substantially. As described before, the user may adopt either step as may be desired.

In this invention, the aperture of the outgoing tape TP-1 can be used for the first switching means (P-1 and CP-1 in FIG. 6*a*) for stopping the tape automatically every one round, and also for the second switching means which does not receive a telephone call during the user's absence as a locking means by operating the second switching means (P-3 and CP-3) after a predetermined number of telephone calls resulting from the rotation of the ratchet wheel by the aperture of the tape TP-1.

In the foregoing I have described the connection of the base of the transistor TR-1 as a locking circuit for the telephone answering and recording device. Other means, such as, the provision of the contact pole CP-3' in parallel with the contact pole CP-1 may be effected in FIG. 6-a wherein the contact pole CP-3' is shown in dotted lines.

In this case, when the ratchet wheel is engaged with the ratchet *f* after the transport of five rounds of the tape TP-1, the pilot lamp PL-1 is lit by grounding it through P-3' and CP-3' the terminal (14). Hence all the direct current flowing into the relay A is grounded through the pilot lamp PL-1 so that the relay A can never be energized either automatically or manually.

Thus, though the transistors TR-1, TR-2 and TR-3 are energized in response to a further telephone call, the relay A cannot be energized by the transistor TR-3, so the above arrangement can function also as a locking circuit.

Furthermore, when the user comes back home, he can easily perceive the arrival of the final end of the tape from the bright light of the pilot lamp. In order to turn off the light of the pilot lamp, P-3' is disengaged out of contact with CP-3' by turning the grip of the counter a little by hand.

However, in case the device of the invention is actuated by the dry cell only, a problem will arise as follows: in view of the dry cell that it must be used as long as its life permits, if the pilot lamp is lit during the user's absence due to the action of the locking means, the dry cell will be exhausted soon.

Hence it is clear that the above locking means will exhibit its advantage fully when the present device is energized by the commercial electricity or AC source in place of the use of the dry cell.

In accordance with the selection of the user, he can use both, by providing a change-over switch for P-3 and P-3', that is, by connecting P-3' to the terminal (7) (FIG. 1) of the relay A, or connecting P-3 to the base of the transistor TR-1.

In the locking circuit including the use of P-3' and CP-3' energized by 100 volt AC, an advantage will be obtained as follows: when the spring contact P-1 (6 in FIG. 6-*a*) comes in contact with the contact pole CP-1 through the aperture of the outgoing tape TP-1, there happens a defective contact between them due to the contamination, scale and the like. In such case, the outgoing tape does not stop at the final location of the whole cycle, but still goes on advancement. In this case, at every cycle of transport, the ratchet wheel also turns round, and when the ratchet *f* assumes the location of FIG. 4 at the end of the fifth cycle, at this location the direct current is again grounded through the pilot lamp, P-3' and CP-3' to deenergize the relay A as effective as the CP-1 contact with P-1 so that the device itself regains its initial condition. Once regained, the pilot lamp continues to be lit by P-3' and CP-3', thus the above-mentioned locking circuit inactive in response to a further telephone call is established, which is one of the advantages of the invention.

As described fully in the foregoing, in accordance with the preferred embodiment of the invention wherein the aperture is provided in the tape, an automatic stop of the telephone answering and recording device at every cycle of the outgoing endless tape, the counting of the number of telephone calls, and the inactivity of the telephone answering and recording device in response to a further telephone call after having answered the predetermined number of telephone calls, for example 5 telephone calls in the preferred embodiment of the invention, can be carried out by the utilization of the single aperture in the outgoing tape of the endless type.

While the invention has been described in detail with respect to a preferred embodiment of the invention, it will be understood by those skilled in the art that various changes and modifications may be made without departing from the scope of the invention.

I claim:

1. An indicator for a predetermined number of telephone calls for the automatic telephone answering and recording device, said answering and recording device comprising both endless outgoing and incoming magnetic tapes being transported by a single capstan and a single pinch roller in contact therewith simultaneously, an electronic circuit containing a recording and reproducing head, an erase head, an amplifier for said tapes, respectively, an input transformer associated with the telephone line, a relay, a pilot lamp connected to said relay, an electric source for energizing said above-mentioned components, and a first electronic switching means to render said electronic circuit inoperative, the improvement which comprises a base, a ratchet wheel having a predetermined number of ratchets, an endless outgoing magnetic tape having an oblong aperture therein, said ratchet wheel being rotatably mounted on said base, each of said ratchets being engageable with said aperture of the tape and being fed by the said aperture of the tape, said ratchets indicating an ordinal number of telephone calls at every cycle of revolution of said outgoing tape, said ratchet wheel being provided with an electric contact means, and the second electronic switching means to render said telephone answering and recording device inoperative.

2. The ratchet wheel as claimed in claim 1 wherein the thickness of each ratchet of said ratchet wheel is less than the size of said oblong aperture of said endless outgoing tape.

3. In the indicator as claimed in claim 3 said aperture of the outgoing magnetic tape is characterized in that the number of telephone calls is shown by the ordinal number marked on each ratchet of said ratchet wheel, the first switching means of said electronic switching means is provided to render the telephone answering and recording device to stop and reset at every telephone call, and the second switching means of said electronic switching means is provided to render the telephone answering and recording device to stop permanently.

4. The electric switching means as claimed in claim 1 wherein said switching means consists of the first switching means comprising the first spring-like wire brush in contact with a contact pole disposed along the threading path of said outgoing magnetic tape, and the second switching means comprising the second spring-like wire brush in contact with said electric contact means affixed to said ratchet wheel, each of said spring-like wire brushes being connected to a different electronic circuit of said device, respectively.

5. The first switching means as claimed in claim 4 wherein said switching means is energized at every cycle of the revolution of said outgoing magnetic tape due to the contact of said contact pole and said first spring-like wire brush passes through said aperture of the outgoing magnetic tape when aligned together.

6. The second switching means as claimed in claim 4 wherein said switching means is energized after the completion of one revolution of said ratchet wheel when said electric contact means affixed to said ratchet wheel is in contact with said second spring-like wire brush.

* * * * *